United States Patent [19]

Niiyama et al.

[11] Patent Number: 5,669,280

[45] Date of Patent: Sep. 23, 1997

[54] HYDRAULIC CONTROL APPARATUS

[75] Inventors: Tsunefumi Niiyama; Haruhiko Yoshikawa; Kazuhisa Yamamoto, all of Saitama-ken, Japan

[73] Assignee: Honda Giken Kogyo Kabushiki Kaisha, Tokyo, Japan

[21] Appl. No.: 577,087

[22] Filed: Dec. 22, 1995

[30] Foreign Application Priority Data

Jan. 5, 1995 [JP] Japan .................... 7-000366

[51] Int. Cl.⁶ .................................. F15B 13/04
[52] U.S. Cl. .................... 91/31; 91/33; 91/431; 60/453
[58] Field of Search .................. 60/453; 91/31, 91/33, 431

[56] References Cited

U.S. PATENT DOCUMENTS

| | | | |
|---|---|---|---|
| 1,873,396 | 8/1932 | Hallenbeck | 60/453 |
| 3,576,241 | 4/1971 | Maurice et al. | 91/31 |
| 4,354,351 | 10/1982 | Dezelan | 91/431 |
| 4,887,512 | 12/1989 | Leising et al. | 91/471 |

FOREIGN PATENT DOCUMENTS 115950 of 1989 Japan .
115951 of 1989 Japan .

*Primary Examiner*—F. Daniel Lopez
*Attorney, Agent, or Firm*—Lyon & Lyon LLP

[57] ABSTRACT

A hydraulic control apparatus for a hydraulically operated vehicular transmission has control valves corresponding to hydraulic engaging elements provided in the transmission. The supply and discharge of hydraulic oil to and from the corresponding hydraulic engaging elements are controlled by the control valves. The hydraulic control apparatus has an oil supply passage which is connected to a hydraulic oil source and into which a throttle is interposed. The oil supply passage is connected to oil passages which are on a downstream side of each of the control valves and which are to be communicated with the hydraulic engaging elements. Check valves are interposed in the oil supply passage to allow for the hydraulic oil flow only from the oil supply passage to the oil passages on the downstream side of each of the control valves.

5 Claims, 3 Drawing Sheets

HYDRAULIC CONTROL APPARATUS

BACKGROUND OF THE INVENTION

1. Field of the Invention

The present invention relates to a hydraulic control apparatus which is mainly used in a hydraulically operated transmission for a vehicle such as a motor vehicle.

2. Description of the Related Art

As this kind of hydraulic control apparatus there is known an apparatus provided with a plurality of control valves which comprise solenoid valves or the like corresponding to a plurality of hydraulic engaging elements provided in a transmission, and the supply and discharge of hydraulic oil to and from each of the hydraulic engaging elements are controlled by each of the control valves to thereby selectively establish each of the transmission trains.

In this kind of apparatus, when the engagement of the hydraulic engaging elements is released by discharging the hydraulic oil therefrom, air gets mixed into oil passages which are on the downstream side of the control valves and which are to be communicated with the hydraulic engaging elements. As a result, the rise in the hydraulic oil pressure is sometimes delayed when the hydraulic oil is supplied again to the hydraulic engaging elements, or the piston stroke time of the hydraulic engaging elements varies or deviates, resulting in an unstable speed change control.

In order to remove this kind of disadvantages, there is conventionally known an apparatus provided with an oil sump or reservoir communicated with a drain port of each of the control valves so that, at the time of discharge of the hydraulic oil from the hydraulic engaging element, the air should not get mixed into the oil passages which are on the downstream side of the control valves and which are connected to the drain port (see U.S. Pat. No. 4,887,512).

In the above-described apparatus, however, when the engine is not in operation, air may get mixed into the oil passages due to oil leakage from sealing elements or the like which are disposed in the oil passages which are on the downstream side of the control valves and which are communicated with the hydraulic engaging elements. In such a case, the air will not be discharged until the hydraulic engaging elements are supplied with the hydraulic oil through the control valves. It follows that, until all the transmission trains have been established during the running of a vehicle, the air remains in the oil passage to be communicated with any one of the hydraulic engaging elements. As a result, shocks are likely to occur at the time of speed changing in which the hydraulic engaging element corresponding to the control valve in question is engaged.

Further, when the vehicle is running on a slope or on a road of bad conditions, air may sometimes get mixed into the oil sump to thereby cause an air mixing or air inclusion to happen, with the result that the speed change control thereafter may become unstable.

In view of the above-described points, the present invention has an object of providing a hydraulic control apparatus in which the air inclusion into the oil passages which are communicated with the downstream side of the control valves and which are communicated with the hydraulic engaging elements can be prevented as much as possible and also in which, even if the air may have been mixed, it can be discharged at an early time, whereby the stability in speed change control can be improved.

SUMMARY OF THE INVENTION

In order to attain the above and other objects, the present invention is a hydraulic control apparatus for a hydraulically operated vehicular transmission having a control valves corresponding to hydraulic engaging elements provided in the transmission, each of the control valves controlling the supply and discharge of hydraulic oil to and from each of the corresponding hydraulic engaging elements, the hydraulic control apparatus comprising: an oil supply passage which is connected to a hydraulic oil source and into which a throttle is interposed, the oil supply passage being connected to oil passages which are on a downstream side of the control valves and which are to be communicated with the hydraulic engaging elements; and check valves which are interposed in the oil supply passage such that the check valves allow for the hydraulic oil flow only from the oil supply passage to the oil passages on the downstream side of each of the control valves.

In this arrangement, it is desirable to dispose the control valves in an elevation higher than the hydraulic engaging elements.

Even if the air may get mixed into the oil passages on the downstream side of each of the control valves when the engine is not in operation, the hydraulic oil is supplied, when the engine is started, from the hydraulic oil source via the oil supply passage to the oil passages which are on the downstream side of each of the control valves and which are to be communicated with the hydraulic engaging elements. The air is thereby discharged and the control of speed changing can be made stably from the beginning of the vehicle starting.

Even when the vehicle is running on a slope or on a bad road, the hydraulic oil is positively supplied to the oil passages on the downstream side of each of the control valves. As a result, the air does not get mixed into the oil passages, and the control of speed changing will not become unstable.

When the engagement of a hydraulic engaging element is released, the corresponding control valve is switched to the discharge side. Therefore, the surplus oil to be supplied from the oil supply passage to the oil passage on the downstream side of the corresponding control valve is discharged through the corresponding control valve. Further, since the amount of oil to be supplied to the oil passages is restrained by the throttle interposed in the oil supply passage, the hydraulic engaging element is maintained in the disengaged condition. In addition, when a corresponding control valve is switched to the oil supply side to engage the hydraulic engaging element to thereby supply the pressurized oil to the oil passage on the downstream side of the corresponding control valve, if the pressurized oil leaks from the oil passage to the oil supply passage, the engaging pressure for the hydraulic engaging element can no longer be controlled accurately. Further, the amount of hydraulic oil supply from the oil supply passage to the oil passages on the downstream side of other control valves that have been switched to the oil discharge side increases and therefore results in a dragging in the hydraulic engaging elements in the disengaged condition. However, according to the present invention, since the check valves are provided, the pressurized oil to be supplied via each of the control valves does not leak to the oil supply passage. Therefore, the above-described disadvantages do not occur.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
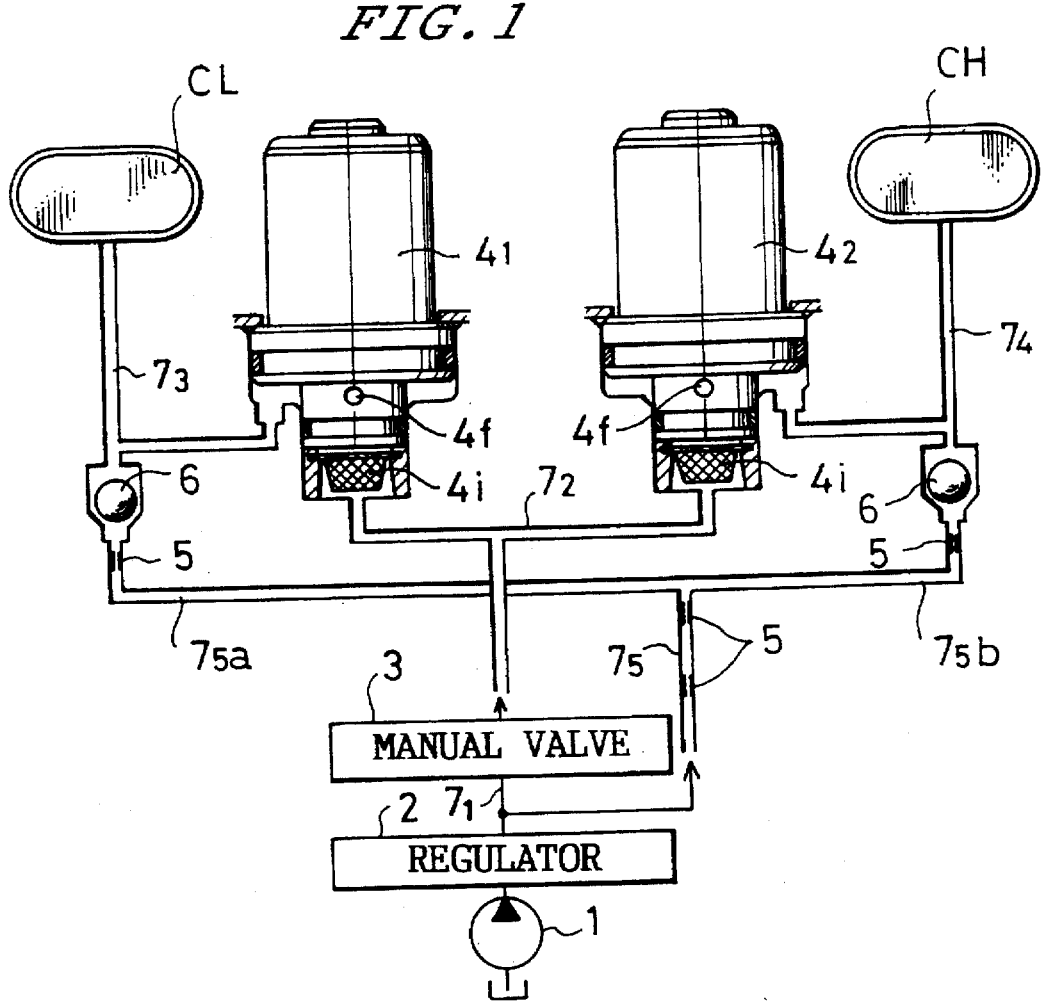
FIG. 1 is a hydraulic circuit diagram of an example of the apparatus of the present invention.

FIG. 1 shows a hydraulic circuit of a hydraulically operated transmission for a vehicle such as a motor vehicle for effecting a two-stage speed changing or shifting by selectively engaging a low-speed hydraulic engaging element CL for establishing a low-speed transmission train and a high-speed hydraulic engaging lement CH for establishing a high-speed transmission train.

In this hydraulic circuit, there are provided a hydraulic oil source 1 which is driven by an engine of the vehicle, a regulator 2 for adjusting the output pressure from the hydraulic oil source 1 to a constant line pressure, a manual valve 3 which is connected to a first oil passage $7_1$ on the downstream side of the regulator 2, and a pair of first and second control valves $4_1$ and $4_2$ which are connected to a second oil passage $7_2$ on the downstream side of the manual valve 3. A third oil passage $7_3$ on the downstream side of the first control valve $4_1$ is connected to the low-speed hydraulic engaging element CL and a fourth hydraulic oil passage $7_4$ on the downstream side of the second control valve $4_2$ is connected to the high-speed hydraulic engaging element CH. The supply and discharge of the hydraulic oil to and from the low-speed hydraulic engaging element CL are controlled by the first control valve $4_1$ and the supply and discharge of the hydraulic oil to and from the high-speed hydraulic engaging element CH are controlled by the second control valve $4_2$.

Figure 2:
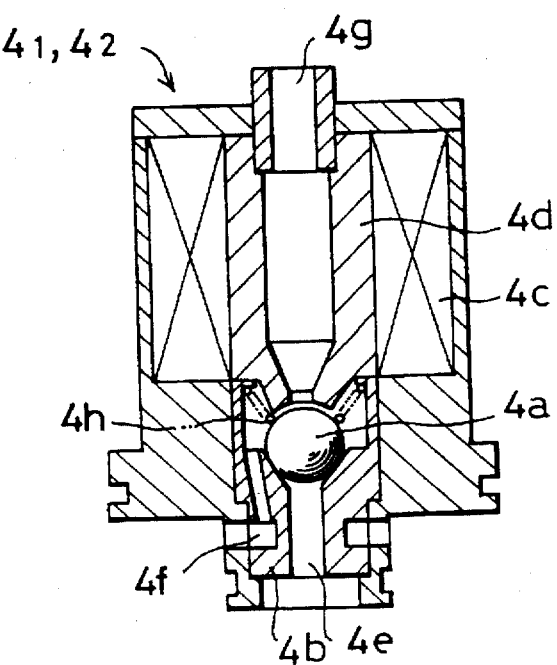
FIG. 2 is a sectional view of a control valve.

Each of the control valves $4_1$ and $4_2$ is constituted, as shown in FIG. 2, as a solenoid valve comprising a ball-like valve body $4a$, a lower valve seat $4b$ for seating thereon the valve body $4a$, and an iron core $4d$ around which a solenoid $4c$ is mounted. The valve seat $4b$ has formed therein an input port $4e$ which penetrates vertically (i.e., in an axial direction) of the valve and, on a periphery of the valve seat $4b$, an output port $4f$ which is communicated with She space between the valve seat $4b$ and the iron core $4b$. Still furthermore, there is formed in the iron core $4d$ an oil discharge port $4g$ which penetrates vertically. The valve body $4a$ is urged or pushed downwards by a spring $4h$, and the input port $4e$ is covered with a strainer $4i$ as shown in FIG. 1.

Each of the control valves $4_1$ and $4_2$ is normally in an oil discharge condition in which the valve body $4a$ is seated on the valve seat $4b$ by the urging force of the spring $4_h$ to thereby block the input port $4e$ and communicate the output port $4f$ with the discharge port $4g$. When the solenoid $4c$ is energized or charged with electricity, the control valve $4_1$, $4_2$ is brought into an oil supply condition in which the valve body $4a$ is sucked into contact with the iron core $4d$ to thereby block the oil discharge port $4g$ and communicate the input port $4e$ with the output port $4f$. When the low-speed transmission train is established, the solenoid $4c$ of the first control valve $4_1$ is energized and the low-speed hydraulic engaging element CL is supplied with the hydraulic oil via the third oil passage $7_3$ for engagement thereof. When the high-speed transmission train is established, the solenoid $4c$ of the second control valve $4_2$ is energized and the high-speed hydraulic engaging element CH is supplied with the hydraulic oil via the fourth oil passage $7_4$ for engagement thereof.

Although in this embodiment the control valves $4_1$ and $4_2$ are arranged to be of normally-closed type, another arrangement may be employed such that one of them is of normally-closed type and the other is of normally-open type. It is also possible to control the duty of the solenoid $4c$ (i.e., to duty-control the solenoid $4c$) to thereby control the pressure rise characteristics and pressure decrease characteristics of the hydraulic engaging elements.

The hydraulic circuit is further provided with a fifth oil passage $7_5$ to be connected via the regulator 2 to the hydraulic oil source 1. This oil passage $7_5$ is branched into two, and one $7_5a$ of the branched oil passages is connected to the third oil passage $7_3$ and the other $7_5b$ thereof is connected to the fourth oil passage $7_4$.

In the fifth oil passage $7_5$ there are interposed a plurality of throttles 5 on an upstream side of the branched point of the fifth oil passage $7_5$ and in each of the branched oil passages $7_5a$ and $7_5b$. In each of the branched oil passages $7_5a$ and $7_5b$ there is further interposed a check valve 6 which allows the hydraulic oil flow only from the upstream side to the downstream side.

According to the above-described arrangement, when the engine is started, the hydraulic oil from the hydraulic oil source 1 flows via the fifth oil passage $7_5$ into the third and the fourth oil passages $7_3$ and $7_4$ via the check valve 6 in each of the branched oil passages $7_5a$ and $7_5b$. Even if air may get mixed into the oil passages $7_3$ and $7_4$ when the engine is not in operation, the air will have already been discharged from the oil passages $7_3$ and $7_4$ when movement of the vehicle is started by shifting the manual valve 3 from the neutral range to the drive range. Therefore, when the low-speed hydraulic engaging element CL is supplied with the hydraulic oil via the first control valve $4_1$, this hydraulic engaging element CL can be engaged with a good response. Engagement with a good response of the high-speed hydraulic engaging element CH can also be obtained when the hydraulic oil is thereafter supplied to the high-speed hydraulic engaging element CH. The speed change control can thus be effected in a stable manner from the first speed change after the movement of vehicle has started.

Once each of the oil passages $7_3$ and $7_4$ is filled with the hydraulic oil by the oil supply from each of the branched oil passages $7_5a$ and $7_5b$, the hydraulic oil is thereafter discharged from the oil discharge port $4g$ of each of the control valves $4_1$ and $4_2$. Due to a balance between the amount of supply and the amount of discharge of the hydraulic oil, the hydraulic oil pressure in each of the oil passages $7_3$ and $7_4$ is maintained, as shown by line "a" in FIG. 6, in an extremely low pressure at which partial engagement and dragging of each of the hydraulic engaging elements CL, CH does not occur. In this case, it is necessary to set the line resistance in the fifth oil passage $7_5$ large enough so that the line pressure in the first oil passage $7_1$ as shown by line b in FIG. 6 does not decrease. That is the reason why the throttles 5 are interposed in the fifth oil passage $7_5$. However, in order to obtain the required line resistance by a single throttle, the throttle opening becomes comparatively small, with the result that blocking of the throttle opening is likely to occur.

Figure 6:
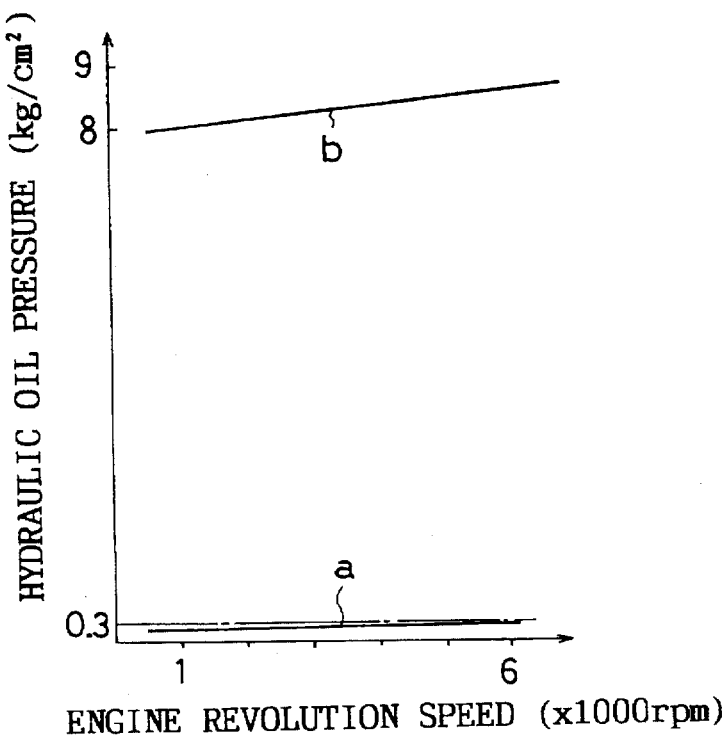
FIG. 6 is a graph showing the hydraulic oil pressure in the oil passages to be communicated with the hydraulic engaging elements and the line pressure.

As a solution, in this embodiment, a plurality of throttles 5 are provided to avoid the possibility of blocking, thereby securing a predetermined line resistance. FIG. 6 shows a hydraulic oil pressure at the normal temperature, and the hydraulic oil pressure in the oil passages $7_3$ and $7_4$ is kept to about 0.3 kg/cm$^2$ even if the engine revolution speed increases to 6000 rpm.

The leak of the hydraulic oil pressure in each of the oil passages $7_3$ and $7_4$ into the fifth oil passage $7_5$ at the time of engagement of the hydraulic engaging elements CL, CH is blocked by the check valve 6 disposed in each of the branched oil passages $7_5a$ and $7_5b$. Therefore, there is no possibility that the control of the hydraulic oil pressure in the hydraulic engaging elements on the side of engagement becomes unstable or that, due to an increase in the amount of the hydraulic oil supply from the fifth oil passage $7_5$ to the hydraulic engaging element on the disengagement side, the hydraulic engaging element is subjected to dragging.

Further, since the hydraulic oil to be supplied from each of the branched oil passages $7_5a$ and $7_5b$ is discharged from the oil discharge port 4g of each of the control valves $4_1$ and $4_2$ as described hereinabove, it is desirable to dispose each of the control valves $4_1$ and $4_2$ above a position or an elevation higher than the hydraulic engaging elements CL, CH, e.g., on an upper surface of the transmission casing, in order to surely fill each of the oil passages $7_3$ and $7_4$ with the hydraulic oil. It is also advantageous to open the oil discharge port 4g of each of the control valves $4_1$ and $4_2$ upwards as in this embodiment, because the control valves $4_1$ and $4_2$ themselves serve as an oil sump and the air is therefore less likely to get mixed.

An explanation has so far been made about a transmission for effecting a two-stage speed changing between a high speed and a low speed. The present invention can also be applied to a transmission 10 for effecting a speed changing among 3 or more transmission trains as shown in FIG. 3.

Figure 3:
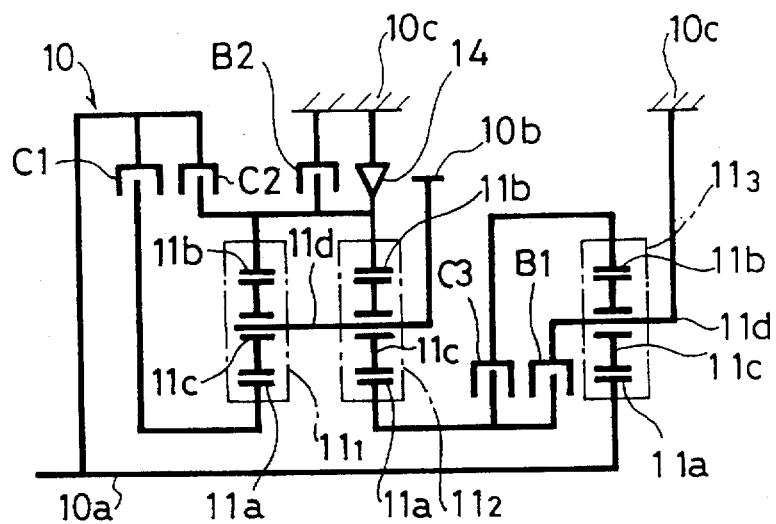
FIG. 3 is a skeleton diagram of a transmission.
Figure 4:
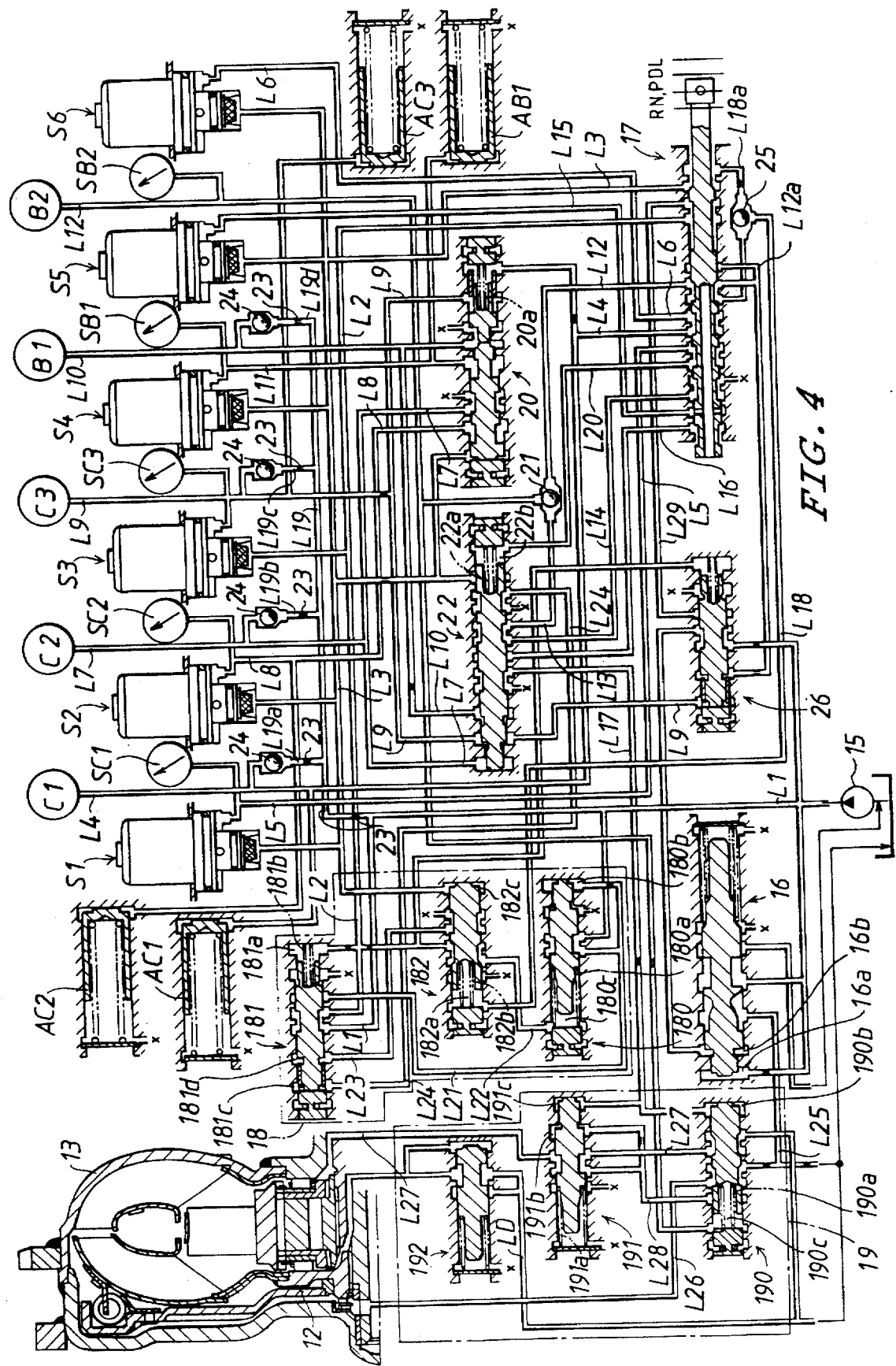
FIG. 4 is a hydraulic circuit diagram of another example of the apparatus of the present invention as applied to the transmission shown in FIG. 3.

The transmission 10 in FIG. 3 is constituted by a planetary gear type of transmission for effecting speed changing of five forward transmission trains and one reverse transmission train, and is provided with an input shaft 10a and a first through a third coaxially disposed three planetary gears $11_1$, $11_2$ and $11_3$. The transmission 10 is connected to an engine (not shown) of a vehicle via a fluid torque converter 13 with a lockup clutch 12 as shown in FIG. 4.

Each of the planetary gears $11_1$, $11_2$ and $11_3$ comprises a sun gear 11a, a ring gear 11b, a pinion 11c which engages with both the gears 11a, 11b, and a carrier 11d which rotatably supports the pinion 11c. The ring gears 11b and the carriers 11d of both the first and the second planetary gears $11_1$ and $11_2$ are respectively connected together, and an output gear 10b of the transmission 10 is connected to the carriers 11d of both the planetary gears $11_1$ and $11_2$. The ring gears 11b of both the planetary gears $11_1$ and $11_2$ are connected, via a one-way clutch 14 which serves as a reaction force receiver, to the casing 10c of the transmission 10. The sun gear 11a of the third planetary gear $11_3$ is connected to the input shaft 10a, and the carrier 11d of the third planetary gear $11_3$ is connected to the casing 10c to prevent rotation.

The transmission 10 is provided with the following as hydraulic engaging elements, i.e., a first clutch C1 for connecting the input shaft 10a to the sun gear 11a of the first planetary gear $11_1$, a second clutch C2 for connecting the input shaft 10a to the ring gears 11b of the first and the second planetary gears $11_1$ and $11_2$, a third clutch C3 for connecting the ring gear 11b of the third planetary gear $11_3$ to the sun gear 11a of the second planetary gear $11_2$, a first brake B1 for connecting the sun gear 11a of the second planetary gear $11_2$ to the carrier 11d of the third planetary gear $11_3$, and a second brake B2 for connecting the ring gears 11b of the first and the second planetary gears $11_1$ and $11_2$ to the casing 10c.

According to the above-described arrangement, when the first clutch C1 is engaged, the first-speed transmission train is established, when the first clutch C1 and the first brake B1 are both engaged, the second-speed transmission train is established, when the first clutch C1 and the third clutch C3 are both engaged, the third-speed transmission train is established, when the first clutch C1 and the second clutch C2 are both engaged, the fourth-speed transmission train is established, when the second clutch C2 and the third clutch C3 are both engaged, the fifth-speed transmission train is established, when the third clutch C3 and the second brake B2 are both engaged, the reverse transmission train is established, and when the first clutch C1 and the second brake B2 are both engaged, the first-speed transmission train is established in a condition in which the engine brake can be effected.

The operation of these clutches C1, C2 and C3 and brakes B1 and B2 is controlled by a hydraulic circuit shown in FIG. 4. The hydraulic circuit is provided with a hydraulic oil source 15, a regulator 16 for adjusting the hydraulic oil pressure in an oil passage L1 communicated with the hydraulic oil source 15 to a predetermined line pressure, a manual valve 17, six solenoid valves S1–S6 for independently controlling the supply and discharge of the hydraulic oil to and from each of the hydraulic clutches C1, C2 and C3 and each of the brakes B1 and B2, a hydraulic oil pressure changeover circuit portion 18, and a control circuit portion 19 for the lockup clutch 12.

The manual valve 17 can be changed over or switched, in interlocking with the operation of a selecting lever (not shown), among R position for reverse transmission range, N and P positions for neutral and parking ranges, D position for automatic transmission or speed changing range, and L position for first-speed holding range. In the D position and the L position, an oil passage L2 to be connected to the oil passage L1 via the hydraulic oil pressure changeover circuit portion 18 is connected to an oil passage L3 to thereby supply the first solenoid valve S1, the second solenoid valve S2, the fourth solenoid valve S4, the fifth solenoid valve S5 and the sixth solenoid valve S6 with the hydraulic oil via the oil passage L3. The third solenoid valve S3 is always supplied with the hydraulic oil via the oil passage L2 irrespective of the manual valve 5.

An oil passage L4 to be communicated with the first clutch C1 is connected to an oil passage L5 on the downstream side of the first solenoid valve S1 in the D position of the manual valve 17 and, in the L position thereof, is connected to an oil passage L6 on the downstream side of the sixth solenoid valve S6. An oil passage L7 to be communicated with the second clutch C2 is connected to an oil passage L8 on the downstream side of the second solenoid valve S2 via a shutoff valve 20 to be described hereinafter. An oil passage L9 to be communicated with the third clutch C3 is directly connected to the downstream side of the third solenoid valve S3. An oil passage L10 to be communicated with the first brake B1 is connected to an oil passage L11 on the downstream side of the fourth solenoid valve S4 via the shutoff valve 20. An oil passage L12 to be communicated with the second brake B2 is opened to the atmosphere in the N, P and D positions of the manual valve 17, and is connected to the oil passage L2 in the R position via a communicating oil passage L12a. Further, there are also provided an oil passage L13 to be connected to the oil passage L12 via a shuttle valve 21, and an oil passage L14 to be connected to the oil passage L13 via a distribution valve 22 which is to be described hereinafter. It is thus so arranged that the oil passage L14 can be connected to an oil passage L15 on the downstream side of the fifth solenoid valve S5 in the L position of the manual valve 17. Further, there is provided an oil passage L16 to be connected to the oil passage L15 in the D position of the manual valve 17. This oil passage L16 is connected to an oil passage L17 for controlling the control circuit portion 19 of the lockup clutch 12 via the distribution valve 22. The oil passage L6 on the downstream side of the sixth solenoid valve S6 is connected to an oil passage L18 for controlling the hydraulic oil pressure change over circuit 18 in the D position of the manual valve 17.

In this arrangement, in the D position of the manual valve 17, the supply and discharge of the hydraulic oil to and from the first through the third clutches C1, C2 and C3 and the first brake B1 becomes capable of being controlled by the solenoid valves S1–S4. When the first clutch C1 is supplied with the hydraulic oil via the first solenoid valve S1 and is engaged, the first-speed transmission train is established. When the first clutch C1 and the first brake B1 are both supplied with the hydraulic oil via the first and the fourth solenoid valves S1, S4 and are engaged, the third-speed transmission train is established. When the first clutch C1 and the second clutch C2 are both supplied with the hydraulic oil via the first and the second solenoid valves S1 and S2 and are engaged, the fourth-speed transmission train is established. When the second clutch C2 and the third clutch C3 are both supplied with the hydraulic oil via the second and the third solenoid valves S2 and S3 and are engaged, the fifth-speed transmission train is established. Further, it also becomes possible to effect the control of the lockup clutch 12 by the fifth solenoid valve S5 and the changeover control of the hydraulic oil pressure via the sixth solenoid valve S6.

In the L position of the manual valve 17, it becomes possible to control the supply and discharge of the hydraulic oil to and from the first clutch C1 and the second brake B2 respectively by the sixth solenoid valve S6 and the fifth solenoid valve S5. When the first clutch C1 is supplied with the hydraulic oil and is engaged via the sixth solenoid valve S6, and also when the second brake B2 is supplied with the hydraulic oil via the fifth solenoid valve S5 and the distribution valve 22 and is engaged, the first-speed transmission train can be established in a condition in which the engine braking can be effected.

In the R position of the manual valve 17, the second brake B2 is always engaged and, when the third clutch C3 is supplied with the hydraulic oil via the third solenoid valve S3 and is engaged, the reverse transmission train is established.

In the Figure, references AC1, AC2, AC3 and AB1 represent accumulators which are provided to prevent the occurrence of speed change shocks (i.e., shocks to occur at the time of speed changing) by alleviating or absorbing sudden changes in the hydraulic oil pressure at the time of supplying and discharging the hydraulic oil to and from the first through the third clutches C1, C2, C3 and the first brake B1, respectively. References SC1, SC2, SC3, SB1 and SB2 are hydraulic oil pressure sensors for detecting the hydraulic oil pressures in the first through the third clutches C1, C2 and C3 and the first and the second brakes B1 and B2.

An oil passage L19 to be communicated with the first oil passage L1 is connected, via each of the branched oil passages L19a, L19b, L19c and L19d, to the oil passage L14 to be communicated with the first clutch C1, the oil passage L7 to be communicated with the second clutch C2, the oil passage L9 to be communicated with the third clutch C3, and the oil passage L10 to be communicated with the first brake B1, respectively. In the oil passage L19 there are disposed a plurality of throttles 23 on the upstream side of the branched portion and in each of the branched oil passages L19a–L19d. In each of the branched oil passages L19a–L19d there is interposed a check valve 24 which allows for the hydraulic oil flow only from the upstream side to the downstream side.

In this arrangement, like in the above-described embodiment of FIGS. 1–3 when the engine is started, the hydraulic oil from the hydraulic oil source 15 flows into each of the oil passages L4, L7, L9 and L10 via each of the check valves 24. When movement of the vehicle is started by switching the manual valve 17 from the N or P position to the D position, the air must have already been discharged from the respective oil passages L4, L7, L9 and L10. The speed changing control after starting the vehicle can thus be stably carried out. Further, when each of the hydraulic engaging elements comprising the clutches C1, C2 and C3 and the first brake B1 is in a disengaged condition, the hydraulic oil to flow via the oil passage L19 into the oil passages L4, L7, L9 and L10, which are communicated with each of the hydraulic engaging elements, is discharged from the oil discharge port of each of the solenoid valves S1–S4. Therefore, the hydraulic oil pressure in each oil passage is maintained in such an extremely low pressure as shown by the line "a" in FIG. 6 as not to cause dragging in each of the hydraulic engaging elements. Further, the leakage in the hydraulic oil pressure to the oil passage L19 at the time of engagement of each of the hydraulic engaging elements is prevented by the check valves 24. Therefore, there is no possibility that the hydraulic oil pressure control of the hydraulic engaging elements on the engaged side becomes unstable due to the leakage in the hydraulic oil pressure or that the dragging of the hydraulic engaging elements occurs due to an increase in the amount of oil supply from the oil passage L19 to the hydraulic engaging elements on the disengaged side.

Figure 5:
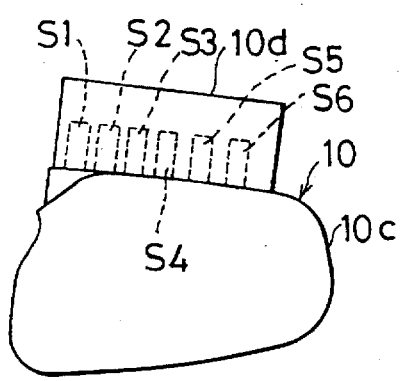
FIG. 5 is a general side view of the transmission.

The first through the sixth solenoid valves S1–S6 are contained inside a cover 10d which is provided on an upper surface of the transmission casing 10c, as shown in FIG. 5. Therefore, each of the solenoid valves S1–S6 is in a condition of being disposed above the elevation of each of the hydraulic engaging elements to be contained inside the casing 10c. It follows that each of the above-described oil passages L4, L7, L9 and L10 is surely filled with the hydraulic oil to flow thereinto from the oil passage L19. The hydraulic oil to be discharged from the oil discharge port of each of the solenoid valves S1–S6 is returned to the inside of the casing 10c via a drain hole which is formed in an upper surface of the casing 10c.

The above-described shutoff valve 20 is switchable between a right-side open position in which the oil passage L7 and the oil passage L8 are communicated together and also in which the oil passage L10 and the oil passage L11 are communicated together, and a left-side closed position in which the above communications are shut off and in which the oil passage L7 and the oil passage L10 are connected to oil discharge ports. The shutoff valve 20 is urged or pushed to the open position by the hydraulic oil pressure in the oil passage L3 and is urged to the closed position by a spring 20a, the hydraulic oil pressure in the oil passage L4, the hydraulic oil pressure in the oil passage L8, the hydraulic oil pressure in the oil passage L9, and the hydraulic oil pressure in the oil passage L11. When the hydraulic oil pressures in three or more of the oil passages L4, L8, L9 and L11 have simultaneously increased, the shutoff valve 20 can be switched to the closed position. In this manner, even if three or more of the first through the fourth solenoid valves S1–S4 were to be opened simultaneously due to their troubles, the engaging of the second clutch C2 and of the first brake B1 is prevented by the switching of the shutoff valve 20 to the closed position. As a result, there is no possibility that two or more transmission trains are simultaneously established.

The above-described distribution valve 22 is switchable between a leftward first position in which the oil passage L13 and the oil passage L14 are communicated together and a rightward second position in which the oil passage L16 and the oil passage L17 are communicated together. In the D position of the manual valve 17, the distribution valve 22 is switched to the second position by the hydraulic oil pressure in the oil passages L7, L9 and L10 against a spring 22a. The oil passage L15 on the downstream side of the fifth solenoid valve S5 is thus connected to the oil passage L17 via the oil passage L16, with the result that the lockup clutch 12 becomes capable of being controlled by the fifth solenoid valve S5. Further, in the L position of the manual valve 17, an oil passage L20 to be communicated with the right end oil chamber 22b of the distribution valve 22 is connected to the oil passage L5 on the downstream side of the first solenoid valve S1. Even if one of the second-speed through the fifth-speed transmission trains has been established, the distribution valve 22 is forcibly switched to the first position by the opening of the first solenoid valve S1, and the oil passage L15 on the downstream side of the fifth solenoid valve S5 is connected to the oil passage L12 via the oil passage L14 and the oil passage L13. As a consequence, it becomes possible to control the second brake B2 by the fifth solenoid valve S5.

The above-described hydraulic oil pressure changeover circuit portion 18 is constituted by a pressure reduction valve 180, a changeover valve 181 and a control valve 182. The hydraulic oil pressure to be supplied to the oil passage L2 on the output side of the changeover valve 181 is switchable between two stages of a high pressure and a low pressure. The pressure reduction valve 180 is urged to the rightward open side by a spring 180a and to the leftward closed position by that hydraulic oil pressure in an oil passage L21 on the downstream side of the pressure reduction valve 180 which is operated on the right end oil chamber 180b. The line pressure to be inputted via the oil passage L1 into the pressure reduction valve 180 is thus outputted into the oil passage L21 after reduction to a pressure corresponding to the urging force of the spring 180a. Furthermore, an oil chamber 180c is formed on the left end of the pressure reduction valve 180 so that, by causing the hydraulic oil pressure to operate on the hydraulic oil chamber 180c, a high hydraulic oil pressure can be outputted to the oil passage L21.

The changeover valve 181 is switchable between the leftward high-pressure position (i.e., the position as illustrated) in which the oil passage L1 is connected to the oil passage L2 whereby the pressure of hydraulic oil supply to the oil passage L2 is made to be the line pressure, and the rightward low-pressure position in which the oil passage L21 is connected to the oil passage L2 whereby the pressure of hydraulic oil supply to the oil passage L2 is made to be the output pressure of the pressure reduction valve 180. The changeover valve 181 is urged towards the high-pressure side by the line pressure which is operated on the right end oil chamber 181a and by a spring 181b, and is urged towards the low-pressure side by the hydraulic oil pressure which is operated on a pair of oil chambers 181c and 181d disposed in the front and rear two stages on the left end side.

The control valve 182 is switchable between a rightward first position (i.e., the position as illustrated) in which an oil passage L22 to be communicated with the oil chamber 180c of the pressure reduction valve 180 is connected to the oil passage L2, and a leftward second position in which an oil passage L23 to be communicated with the oil chamber 181d of the changeover valve 181 is connected to the oil passage L2. The changeover valve 182 is urged towards the first position by the hydraulic oil pressure which is operated on the left end oil chamber 182a and by a spring 182b, and is urged towards the second position by that hydraulic oil pressure in the oil passage L3 which is operated on the right end oil chamber 182c.

An oil passage L24 to be connected to the oil passage L3 in the second position of the above-described distribution valve 22 is connected to the oil chamber 181c of the changeover valve 181, and also the oil passage L18 to be connected to the oil passage L6 on the downstream side of the sixth solenoid valve S6 in the D position of the manual valve 17 is connected to the oil chamber 182a of the control valve 182. The changeover valve 181 is so arranged that it can be switched to the low-pressure position when the hydraulic oil pressures in the oil chamber 181c and in the oil chamber 181d both become high. Here, the time when the hydraulic oil pressure in the oil chamber 181d becomes high is when, due to closing of the sixth solenoid valve S6, the hydraulic oil pressure in the oil chamber 182a of the control valve 182 is decreased to thereby switch the control valve 182 to the second position. Further, the time when the hydraulic oil pressure in the oil chamber 181c becomes high is when the distribution valve 22 is switched to the second position, i.e., when one of the second-speed through the fifth-speed transmission trains has been established. Thus, if the sixth solenoid valve S6 is closed when one of the second-speed transmission train through the fifth-speed transmission train has been established, the changeover valve 181 can be switched to the low-pressure position. Therefore, if the sixth solenoid valve S6 is closed at the time of speed changing between the second-speed transmission train through the fifth-speed transmission train, the input pressure to each of the solenoid valves S1–S6 becomes low. Consequently, it becomes possible, in the transient regions of engagement in the low pressure, to control more precisely the pressure rise characteristics and the pressure decrease characteristics of the hydraulic oil pressure in each of the hydraulic engaging elements comprising the first through the third clutches C1, C2 and C3 and the first brake B1 by means of the duty control of the first through the fourth solenoid valves S1–S4. The occurrence of shocks at the time of speed changing can thus be prevented.

By the way, if the changeover valve 181 is restrained to the low-pressure position due, for example, to the inclusion of foreign matters or the like, the hydraulic oil pressure of the hydraulic engaging elements to be engaged by speed changing remains low even after the speed changing, resulting in the occurrence of slipping of the hydraulic engaging elements. However, in this embodiment, when the control valve 182 is returned to the first position by the input of the hydraulic oil pressure via the oil passage L18 by opening the sixth solenoid valve S6 after speed changing, the hydraulic oil pressure is inputted to the oil chamber 180c of the pressure reduction valve 180 via the oil passage L22. The pressure reduction valve 180 is thus urged to the side of opening and consequently the pressure reducing operation is stopped. In this manner, even if the changeover valve 181 may be restrained to the low-pressure position, the pressure of hydraulic oil supply to the oil passage L2 becomes the line pressure, and the slipping of the hydraulic engaging elements do not occur.

Further, if the sixth solenoid valve S6 is left closed due to its trouble, the control valve 182 is maintained in the second position. In this case, if the changeover valve 181 is switched to the low-pressure position only by the hydraulic oil pressure in the oil passage L23, the changeover valve 181 remains in the low-pressure position, and the hydraulic oil pressure in the oil passage L2 always becomes a low pressure. Therefore, even if the first clutch C1 is supplied with the hydraulic oil via the first solenoid valve S1 at the time of vehicle starting, its engaging pressure cannot be increased high enough, with the result that the slippage occurs in the first clutch C1 and that the starting characteristics of the vehicle becomes poor. However, in the present embodiment, unless the hydraulic oil pressure is inputted via the oil passage L24 by upshifting to the second-speed transmission train or more as explained hereinabove, the changeover valve 181 is retained in the high-pressure position. Therefore, even if the sixth solenoid valve S6 may be left closed due to its trouble, the starting of the vehicle in the first-speed transmission train by the engagement of the first clutch C1 can surely be effected.

To the oil passage L18 there is connected, via a shuttle valve 25, an oil passage L18a to be connected to the oil passage L2 in the L position of the manual valve 17. Accordingly, in the L position of the manual valve 17 the control valve 182 is always maintained in the first position, and the pressure of the hydraulic oil supply to the oil passage L2 is maintained in the line pressure.

The control circuit portion 19 of the lockup clutch 12 is to control the operation of the lockup clutch 12 with the hydraulic oil to be supplied from the regulator 16 via an oil passage L25 serving as the working oil. It is made up of a shift valve 190 for controlling the switching on and switching off of the operation of the lockup clutch 12, a control valve 191 for controlling to increase and decrease the engaging force of the lockup clutch 12, and a pressure adjusting valve 192 which is interposed in the oil discharge passage LD to be communicated with the internal space of the fluid torque converter 13.

The shift valve 190 is switchable between the rightward OFF position (i.e., the position as illustrated) in which an oil passage L26 to be communicated with the back pressure chamber of the lockup clutch 12 is connected to the oil passage L25, and the leftward ON position in which an oil passage L27 to be communicated with the internal space of the fluid torque converter 13 is connected to the oil passage L25 and also in which the oil passage L26 is connected to an oil passage L28 to be communicated with the control valve 191. The shift valve 190 is urged towards the OFF position by a spring 190a and is urged towards the ON position by the hydraulic oil pressure to be inputted to the right end oil chamber 190b. Further, the oil passage L12 to be communicated with the second brake B2 is connected to the left end oil chamber 190c of the shift valve 190 so that the shift valve 190 can be maintained in the OFF position when the second brake B2 is engaged.

The control valve 191 is urged by a spring 191a towards the rightward opening side in which the oil passage L28 is communicated with the oil passage L27. By providing two stages of front and rear oil chambers 191b and 191c on the right end side, the hydraulic oil pressure of the oil passage L28 is inputted to the oil chamber 191b so that the hydraulic oil pressure in the oil passage L28 can be reduced depending on the hydraulic oil pressure to be inputted to the oil chamber 191c.

To the oil chamber 190b of the shift valve 190 and to the oil chamber 191c of the control valve 191, there is connected the above-described oil passage L17. When the distribution valve 22 is switched to the second position in the D position of the manual valve 17, the output pressure P of the fifth solenoid valve S5 is inputted to both the oil chambers 190b and 191c via the oil passages L15, L16 and L17. Further, when the output pressure P of the fifth solenoid valve S5 has risen above a predetermined first set pressure P1, the shift valve 190 is switched to the ON position, and when the output pressure P has risen above a second set pressure P2 that is set higher than P1, the control valve 191 is moved to the left from the right end fully opened position, whereby the hydraulic oil pressure in the oil passage L28 can be reduced depending on the increase in the output pressure P.

According to the above arrangement, when P<P1, the shift valve 190 is positioned in the OFF position and, consequently, the hydraulic oil is supplied from the oil passage L25 to the back pressure chamber of the lockup clutch 12 via the oil passage L26, and also the hydraulic oil is discharged from the inner space of the fluid torque converter 13 via the oil passage L27 and the shift valve 190, whereby the lockup clutch 12 is switched off. When P≧P1, the shift valve 190 is switched to the ON position and, consequently, the hydraulic oil is supplied from the oil passage L25 to the inner space of the fluid torque converter 13 via the oil passage L27. As a result, the hydraulic oil pressure in the inner space becomes a relatively high pressure that is defined by the pressure adjusting valve 192, and the lockup clutch 12 is urged towards the side of engagement by the hydraulic oil pressure. When P1≦P<P2, since the control valve 191 is in the fully opened position, the hydraulic oil pressure in the oil passage L28 becomes equal to that in the oil passage L27. Consequently, the hydraulic oil pressure in the inner space of the fluid torque converter 13 and the hydraulic oil pressure to be inputted from the oil passage L28 to the back pressure chamber of the lockup clutch 12 via the oil passage L26 become equal to each other, whereby the lockup clutch 12 is maintained substantially in the OFF condition. When P≧P2, since the hydraulic oil pressure in the oil passage L28 becomes lower than that in the oil passage L27, the lockup clutch 12 becomes ON and the engaging force of the lockup clutch 12 increases in accordance with the increase in P.

By the way, it may be considered to directly connect the oil passage L16 to the oil passage L17 without passing through the distribution valve 22. In this case, if the output pressure P remains to be a high pressure due to a trouble in the fifth solenoid valve S5, the lockup clutch 12 remains to be in the position of ON even at the time of establishment of the first-speed transmission train. There is, therefore, a possibility that the engine stalls at the time of starting or stopping of the vehicle. On the other hand, in the present embodiment, unless the distribution valve 22 is switched to the second position by attaining the second-speed transmission train or more, the output pressure P of the fifth solenoid valve S5 is not inputted to the control circuit portion 19 of the lockup clutch 12. Therefore, even if the output pressure P remains high, the lockup clutch 12 becomes OFF at the time of establishment of the first-speed transmission train, with the result that the engine stalling does not occur at the time of starting or stopping of the vehicle.

In the present embodiment, the regulator 16 is provided with two stages of front and rear oil chambers 16a and 16b for urging it towards the direction of pressure reduction (to the right). The oil chamber 16a is directly connected to the oil passage L1, and the oil chamber 16b can be selectively connected, via an oil pressure changeover valve 26, to the oil passage L1 and an oil passage L29 which is opened to the atmosphere in the R position of the manual valve 17. The oil pressure changeover valve 26 is urged to the rightward position in which the oil chamber 16b and the oil passage L29 are in communication with each other, by the hydraulic oil pressure of the communicating oil passage L12a to be connected to the oil passage L12 for the second brake B2 in the R position of the manual valve 17 and by the hydraulic oil pressure of the oil passage L9 for the third clutch C3. In this manner, at the time of establishing the reverse transmission train, the oil chamber 16b is opened to the atmosphere via the oil passage L29 so that the output pressure of the regulator 16, i.e., the line pressure, can be increased.

In this embodiment, there are provided five hydraulic engaging elements in total comprising the first through the third clutches C1, C2 and C3 and the first and the second brakes B1 and B2. Since the second brake B2 is not engaged in the D position of the manual valve 17, the hydraulic oil supply to the oil passage L12 to be communicated with the second brake B2 via the oil passage L19 is not made. However, an arrangement may also be made such that the hydraulic oil is supplied from the oil passage L19.

As can be seen from the above explanations, according to the present invention, even if air may get mixed into the oil passages on the downstream side of the control valves when the engine is not in operation, the air can be discharged at an early time. Further, the air will not get mixed with the hydraulic oil even when the vehicle is running up a slope or on a bad road. A stable speed changing can therefore be made all the time.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic control apparatus for a hydraulically operated vehicular transmission having control valves corresponding to hydraulic engaging elements provided in said transmission, each of said control valves controlling the supply and discharge of hydraulic oil to and from each of said corresponding hydraulic engaging elements, said hydraulic control apparatus comprising:

an oil supply passage which is connected to a hydraulic oil source and into which a throttle is interposed, said oil supply passage being connected to oil passages which are on a downstream side of each of said control valves and which are to be communicated with said hydraulic engaging elements;

check valves which are interposed in said oil passages such that said check valves allow for the hydraulic oil flow only from said oil supply passage to said oil passages on the downstream side of each of said control valves; and wherein said control valves are disposed in an elevation higher than said hydraulic engaging elements.

2. A hydraulic control apparatus according to claim 1, wherein said oil supply passage is provided with a plurality of throttles interposed therein.

3. A hydraulic control apparatus for a hydraulically operated vehicular transmission having at least one control valve corresponding to a hydraulic engaging element provided in said transmission, the control valve controlling the supply and discharge of hydraulic oil to and from the hydraulic engaging element, the hydraulic control apparatus comprising:

an oil supply passage connected from a hydraulic oil source to both a downstream side of said control valve and said hydraulic engaging element;

means for allowing the hydraulic oil flow only in a direction from said oil supply passage to said downstream side of said control valve and said hydraulic engaging element; and wherein said control valve is disposed at an elevation higher than said hydraulic engaging element.

4. A hydraulic control apparatus according the claim 3, wherein said oil supply passage is provided with a plurality of throttles interposed therein.

5. A hydraulic control apparatus according the claim 3, wherein said oil supply passage is provided with means for providing a low hydraulic pressure from said hydraulic oil source to said hydraulic engaging element.

* * * * *